United States Patent
Kaikkonen et al.

(10) Patent No.: US 12,047,793 B2
(45) Date of Patent: Jul. 23, 2024

(54) METHOD FOR POWER CONSUMPTION REDUCTION FOR MEASUREMENT CONFIGURATIONS

(71) Applicant: NOKIA TECHNOLOGIES OY, Espoo (FI)

(72) Inventors: Jorma Johannes Kaikkonen, Oulu (FI); Timo Koskela, Oulu (FI); Sami-Jukka Hakola, Kempele (FI); Juha Pekka Karjalainen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 518 days.

(21) Appl. No.: 17/290,874

(22) PCT Filed: Oct. 31, 2019

(86) PCT No.: PCT/EP2019/079813
§ 371 (c)(1),
(2) Date: May 3, 2021

(87) PCT Pub. No.: WO2020/089388
PCT Pub. Date: May 7, 2020

(65) Prior Publication Data
US 2021/0392525 A1     Dec. 16, 2021

Related U.S. Application Data (60) Provisional application No. 62/754,680, filed on Nov. 2, 2018.

(51) Int. Cl.
*H04W 24/08*     (2009.01)
*H04L 5/00*     (2006.01)
(Continued)

(52) U.S. Cl.
CPC .......... *H04W 24/08* (2013.01); *H04L 5/0048* (2013.01); *H04W 24/10* (2013.01); *H04W 52/0229* (2013.01)

(58) Field of Classification Search
None
See application file for complete search history.

(56) References Cited

U.S. PATENT DOCUMENTS

2015/0146561 A1*    5/2015    Jung ..................... H04B 7/024
                                                                370/252
2018/0262313 A1     9/2018    Nam et al.
(Continued)

FOREIGN PATENT DOCUMENTS

CN     106465173 A     2/2017
CN     108352909 A     7/2018
(Continued)

OTHER PUBLICATIONS

International Search Report and Written Opinion dated Dec. 16, 2019 corresponding to International Patent Application No. PCT/EP2019/079813.
(Continued)

*Primary Examiner* — Srinivasa R Reddivalam
(74) *Attorney, Agent, or Firm* — SQUIRE PATTON BOGGS (US) LLP (57) ABSTRACT

In accordance with example embodiments of the invention there is at least a method and apparatus to perform at least receiving from a communication network, by a user equipment, a measurement configuration; determining to adapt the measurement configuration, wherein the adapted measurement configuration identifies mobility measurements for use by the user equipment based on at least one condition;
(Continued)

and performing the adapted measurement configuration instead of the measurement configuration received from the communication network.

14 Claims, 4 Drawing Sheets

(51) Int. Cl.
*H04W 24/10* (2009.01)
*H04W 52/02* (2009.01)

(56) References Cited

U.S. PATENT DOCUMENTS

| | | | |
|---|---|---|---|
| 2019/0124690 A1* | 4/2019 | Siomina | H04W 24/10 |
| 2019/0229868 A1* | 7/2019 | Siomina | H04L 5/0098 |
| 2020/0351688 A1* | 11/2020 | Siomina | H04W 24/10 |
| 2021/0076278 A1* | 3/2021 | Tang | H04W 36/08 |

FOREIGN PATENT DOCUMENTS

| | | |
|---|---|---|
| WO | WO 2014/025302 A1 | 2/2014 |
| WO | 2017/138869 A1 | 8/2017 |
| WO | WO 2017/137445 A1 | 8/2017 |
| WO | WO 2018/062845 A1 | 4/2018 |
| WO | 2018/083377 A1 | 5/2018 |
| WO | 2018/175721 A1 | 9/2018 |

OTHER PUBLICATIONS

3GPP TS 38.331 V15.3.0 (Sep. 2018), Technical Specification, 3rd Generation Partnership Project; Technical Specification Group Radio Access Network; NR; Radio Resource Control (RRC) protocol specification (Release 15), Sep. 26, 2018, pp. 1-445, XP051487433.
Nokia et al., "Remaining details on mobility measurements," 3GPP Draft; R1-1800807, 3GPP TSG-RAN WG1 NR AH #18-01, Vancouver, Canada, Jan. 12, 2018, XP051384442.
First Examination Report dated Mar. 8, 2022 corresponding to Indian Patent Application No. 202147022130.
Communication pursuant to Article 94(3) EPC dated May 9, 2023 corresponding to European Patent Application No. 19797687.1.
Oppo, "UE power Consumption Reduction in RRM Measurements," 3GPP Draft; R1-1900306, 3GPP TSG RAN WG1 Ad-Hoc Meeting 1901, Taipei, Jan. 21-25, 2019, Jan. 20, 2019, XP051593220.
First Office Action dated Oct. 19, 2023 corresponding to Chinese Patent Application No. 201980087574.8, with English summary thereof.
Panasonic, "TP for introducing a new timer in the BFR configuration," R2-1805336, 3GPP TSG-RAN WG2 #101bis, Sanya, China, Apr. 16-Apr. 20, 2018.

* cited by examiner

```
From 38.331
SSB-MTC : : =                        SEQUENCE {
    periodicityAndOffset                 CHOICE {
        sf5                                  INTEGER (0..4) ,
        sf10                                     INTEGER (0..9) ,
        sf20                                     INTEGER (0..19) ,
        sf40                                     INTEGER (0..39) ,
        sf80                                     INTEGER (0..79) ,
        sf160                            INTEGER (0..159) ,
    } ,
    duration                             ENUMERATED { sf1, sf2, sf3, sf4, sf5 }
}

SSB-MTC2 : : =                       SEQUENCE {
    pci-List                             SEQUENCE (SIZE (1..maxNrofPCIsPerSMTC) ) OF PhysCellId
OPTIONAL, - - Need M
    periodicity                          ENUMERATED {sf5, sf10, sf20, sf40, sf80, spare3,
spare2, spare1 }
}
```

FIG. 1A

From 38.331
SSB-ToMeasure
The IE SSB-ToMeasure is used to configure a pattern of SSB's
                    SSB-ToMeasure information element
-- ASN1START
-- TAG-SSB-TOMEASURE-START

```
SSB-ToMeasure : : =                  CHOICE {
    shortBitmap                          BIT STRING (SIZE (4)),
    mediumBitmap                         BIT STRING (SIZE (8)),
    longBitmap                           BIT STRING (SIZE (64))
}
```

-- TAG-SSB-TOMEASURE-STOP
-- ASN1STOP

METHOD FOR POWER CONSUMPTION REDUCTION FOR MEASUREMENT CONFIGURATIONS

TECHNICAL FIELD

The teachings in accordance with the exemplary embodiments of this invention relate generally to configuration of a set of synchronization signal blocks in a block measurement time configuration window, more specifically, relate to configuration of a set of synchronization signal blocks in a block measurement time configuration window at a user equipment using a mask list configuration for at least energy savings by the user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
DMRS Demodulation Reference Signal
PSS Primary Synchronization Signal
TCI Transmission Configuration Index
RRM Radio resource Management
SMTC SS/PBCH Block Measurement Timing Configuration
SS Synchronization Signal
SSB SS/PBCH Block
SSS Secondary Synchronization Signal
SS/PPBCH Synchronization Signal/Physical Broadcast Channel
SS-RSRP SS reference signal received power
CSI-RS Channel State Information Reference Signals
NR New Radio
NZP-CSI-RS Non-Zero-Power CSI-RS
PBCH Physical Broadcast Channel
PCI Physical Cell Identity
PSS Primary Synchronization Signal
RRM Radio Resource Management
RRC Radio Resource Control
RSRP Reference Signal
RSRQ Reference Signal Received Quality
SMTC SS/PBCH Block Measurement Timing Configuration In new radio (NR) implementations of 5th generation (5G) wireless access technology, there are a variety of usage scenarios for use in enhanced mobile broadband communication. One study item in NR release 16 aims to find techniques to reduce UE power consumption to improve the energy efficiency of 5G NR UEs (specified in Release-15). Example embodiments of the invention as described herein work to further advance 5G NR user equipment power consumption reduction and improve energy efficiency of 5G NR user equipment.

SUMMARY

In an example aspect of the invention, there is a method comprising: receiving from a communication network, by a user equipment, a measurement configuration; determining to adapt the measurement configuration, wherein the adapted measurement configuration identifies mobility measurements for use by the user equipment based on at least one condition; and performing the adapted measurement configuration instead of the measurement configuration received from the communication network.

A further example embodiment is a method comprising the method of the previous paragraph, wherein the at least one condition comprises at least one of a synchronization signal block signal quality condition, and a channel state reference signal associated with the measurement configuration, wherein the adapting comprises applying for the measurement configuration an adapted configuration associated with at least one of measurements, a time location, or a periodicity associated with measurements of at least one synchronization signal block, wherein the adapted configuration comprises at least one of frequency or cell level information, wherein the determining to adapt the measurement configuration uses frequency level information or a lack thereof to adapt the at least one of measurements, a time location, or a periodicity associated with a mask or list configuration for measurement of at least one synchronization signal block with a different center frequency, wherein the determining to adapt the measurement configuration comprises based on the adapted configuration for the measurement configuration determining at least one of a scaling factor or an offset to an S-measure threshold to adapt the S-measure threshold, wherein for a case where a cell quality based on the channel state reference signal or synchronization signal block associated with the measurement configuration is higher than the adapted S-measure threshold or a configured threshold, there is one of: the user equipment is not required to perform the measurements on non-serving cells, the user equipment performing the measurements on non-serving cells with with an adjusted periodicity or the user equipment is to measure in more relaxed manner the at least one synchronization signal block having the different center frequency, wherein the more relaxed manner comprises based on the frequency level information applying an adjusted periodicity to cause a periodicity of at least one of a measurement periodicity or a radio resource management to increase such as to be performed less often on the at least one synchronization signal block having the different center frequency and during at least one of an idle, inactive, or connected mode of the user equipment, and wherein the determining to adapt the measurement configuration is including intra-frequency, inter-frequency, and carrier aggregation for a specific cell or a set of cells of the communication network.

In accordance with the example embodiments as described in the paragraphs above, wherein the determining comprises identifying a set of the at least one synchronization signal block based on the at least one condition, wherein the set is identified based on a signal quality condition associated with the synchronization signal block signal, wherein based on a beam configuration at a location of the user equipment, the adapted measurement configuration causes the user equipment to measure only a subset of the set of synchronization signal blocks, wherein the measuring the subset of the set of synchronization signal block based on the adapted measurement configuration is performed by at least one of using a reduced number of synchronization signal block locations, or measuring the subset of the set of synchronization signal blocks with an adjusted periodicity, wherein the location of the user equipment is determined using at least one of an L1 reference received signal power measurement and a synchronization signal reference received signal power measurement, wherein the periodicity associated with the measurements of at least one synchronization signal block comprises at least one of: an adapted configuration is applied for all synchronization signal block measurement time instances associated with a block measurement time configuration window, an adapted configuration is applied for synchronization signal block measurement time instances indicated by a new periodicity associated with a block measurement time configuration window, or an adapted configuration is applied for synchronization signal block measurement time instances indicated by a new window duration associated with at least one of a block measurement time configuration window or offset, wherein the adapted configuration is applied when a location of the user equipment one of remains within specific geographical boundaries or is estimated to be in a specific location of the communication network or under a coverage of certain signals, wherein the coverage is based on cell quality (one or more) synchronization signal block or (one or more) or channel state signal quality meets the relative or absolute signal quality threshold condition for duration of time, wherein the adapted measurement configuration is applied, when an activation of transmission configuration for physical downlink control channel is indicated for the user equipment, for determining one of: a channel state information reference signal based adaptation, a synchronization signal block based adaptation, or a synchronization signal block based adaptation, wherein the at least one condition is one of determined by the user equipment or provided by the communication network.

In accordance with the example embodiments as described in the paragraphs above, wherein the determining to adapt the measurement configuration is based on condition of a user equipment mobility state, where the user equipment mobility state may be determined to be low, medium, high, or stationary, and wherein the user equipment mobility state is determined by the communication network or by the user equipment, autonomously or based on some predefined rules or by communication network and indicated to user equipment.

In accordance with the example embodiments as described in the paragraphs above, wherein the mobility measurements for use by the user equipment based on the at least one condition apply while the user equipment is in any one of a connected state, an inactive state or an idle state.

In another example aspect of the invention, there is an apparatus comprising: means for receiving from a communication network, by a user equipment, a measurement configuration; means for determining to adapt the measurement configuration, wherein the adapted measurement configuration identifies mobility measurements for use by the user equipment based on at least one condition; and means for performing the adapted measurement configuration instead of the measurement configuration received from the communication network.

In accordance with the example embodiments as described in the paragraph above, at least the means for configuring and sending comprises a network interface, and computer program code stored on a computer-readable medium and executed by at least one processor.

A further example embodiment is an apparatus comprising the apparatus of the previous paragraphs, wherein the at least one condition comprises at least one of a synchronization signal block signal quality condition, and a channel state reference signal associated with the measurement configuration, wherein the adapting comprises applying for the measurement configuration an adapted configuration associated with at least one of measurements, a time location, or a periodicity associated with measurements of at least one synchronization signal block, wherein the adapted configuration comprises at least one of frequency or cell level information, wherein the determining to adapt the measurement configuration uses frequency level information or a lack thereof to adapt the at least one of measurements, a time location, or a periodicity associated with a mask or list configuration for measurement of at least one synchronization signal block with a different center frequency, wherein the determining to adapt the measurement configuration comprises based on the adapted configuration for the measurement configuration determining at least one of a scaling factor or an offset to an S-measure threshold to adapt the S-measure threshold, wherein for a case where a cell quality based on the channel state reference signal or synchronization signal block associated with the measurement configuration is higher than the adapted S-measure threshold or a configured threshold, there is one of: the user equipment is not required to perform the measurements on non-serving cells, the user equipment performing the measurements on non-serving cells with with an adjusted periodicity or the user equipment is to measure in more relaxed manner the at least one synchronization signal block having the different center frequency, wherein the more relaxed manner comprises based on the frequency level information applying an adjusted periodicity to cause a periodicity of at least one of a measurement periodicity or a radio resource management to increase such as to be performed less often on the at least one synchronization signal block having the different center frequency and during at least one of an idle, inactive, or connected mode of the user equipment, and wherein the determining to adapt the measurement configuration is including intra-frequency, inter-frequency, and carrier aggregation for a specific cell or a set of cells of the communication network.

In accordance with the example embodiments as described in the paragraphs above, wherein the determining comprises identifying a set of the at least one synchronization signal block based on the at least one condition, wherein the set is identified based on a signal quality condition associated with the synchronization signal block signal, wherein based on a beam configuration at a location of the user equipment, the adapted measurement configuration causes the user equipment to measure only a subset of the set of synchronization signal blocks, wherein the measuring the subset of the set of synchronization signal block based on the adapted measurement configuration is performed by at least one of using a reduced number of synchronization signal block locations, or measuring the subset of the set of synchronization signal blocks with an adjusted periodicity, wherein the location of the user equipment is determined using at least one of an L1 reference received signal power measurement and a synchronization signal reference received signal power measurement, wherein the periodicity associated with the measurements of at least one synchronization signal block comprises at least one of: an adapted configuration is applied for all synchronization signal block measurement time instances associated with a block measurement time configuration window, an adapted configuration is applied for synchronization signal block measurement time instances indicated by a new periodicity associated with a block measurement time configuration window, or an adapted configuration is applied for synchronization signal block measurement time instances indicated by a new window duration associated with at least one of a block measurement time configuration window or offset, wherein the adapted configuration is applied when a location of the user equipment one of remains within specific geographical boundaries or is estimated to be in a specific location of the communication network or under a coverage of certain signals, wherein the coverage is based on cell quality (one or more) synchronization signal block or (one or more) or channel state signal quality meets the relative or absolute signal quality threshold condition for duration of time, wherein the adapted measurement configuration is applied, when an activation of transmission configuration for physical downlink control channel is indicated for the user equipment, for determining one of: a channel state information reference signal based adaptation, a synchronization signal block based adaptation, or a synchronization signal block based adaptation, wherein the at least one condition is one of determined by the user equipment or provided by the communication network.

In an example aspect of the invention, there is an apparatus, comprising: at least one processor; and at least one memory including computer program code, where the at least one memory and the computer program code are configured, with the at least one processor, to cause the apparatus to at least: receive from a communication network, by a user equipment, a measurement configuration; determine to adapt the measurement configuration, wherein the adapted measurement configuration identifies mobility measurements for use by the user equipment based on at least one condition; and perform the adapted measurement configuration instead of the measurement configuration received from the communication network.

A further example embodiment is an apparatus comprising the apparatus of the previous paragraph, wherein the at least one condition comprises at least one of a synchronization signal block signal quality condition, and a channel state reference signal associated with the measurement configuration, wherein the adapting comprises applying for the measurement configuration an adapted configuration associated with at least one of measurements, a time location, or a periodicity associated with measurements of at least one synchronization signal block, wherein the adapted configuration comprises at least one of frequency or cell level information, wherein the determining to adapt the measurement configuration uses frequency level information or a lack thereof to adapt the at least one of measurements, a time location, or a periodicity associated with a mask or list configuration for measurement of at least one synchronization signal block with a different center frequency, wherein the determining to adapt the measurement configuration comprises based on the adapted configuration for the measurement configuration determining at least one of a scaling factor or an offset to an S-measure threshold to adapt the S-measure threshold, wherein for a case where a cell quality based on the channel state reference signal or synchronization signal block associated with the measurement configuration is higher than the adapted S-measure threshold or a configured threshold, there is one of: the user equipment is not required to perform the measurements on non-serving cells, the user equipment performing the measurements on non-serving cells with with an adjusted periodicity or the user equipment is to measure in more relaxed manner the at least one synchronization signal block having the different center frequency, wherein the more relaxed manner comprises based on the frequency level information applying an adjusted periodicity to cause a periodicity of at least one of a measurement periodicity or a radio resource management to increase such as to be performed less often on the at least one synchronization signal block having the different center frequency and during at least one of an idle, inactive, or connected mode of the user equipment, and wherein the determining to adapt the measurement configuration is including intra-frequency, inter-frequency, and carrier aggregation for a specific cell or a set of cells of the communication network.

In accordance with the example embodiments as described in the paragraphs above, wherein the determining comprises identifying a set of the at least one synchronization signal block based on the at least one condition, wherein the set is identified based on a signal quality condition associated with the synchronization signal block signal, wherein based on a beam configuration at a location of the user equipment, the adapted measurement configuration causes the user equipment to measure only a subset of the set of synchronization signal blocks, wherein the measuring the subset of the set of synchronization signal block based on the adapted measurement configuration is performed by at least one of using a reduced number of synchronization signal block locations, or measuring the subset of the set of synchronization signal blocks with an adjusted periodicity, wherein the location of the user equipment is determined using at least one of an L1 reference received signal power measurement and a synchronization signal reference received signal power measurement, wherein the periodicity associated with the measurements of at least one synchronization signal block comprises at least one of: an adapted configuration is applied for all synchronization signal block measurement time instances associated with a block measurement time configuration window, an adapted configuration is applied for synchronization signal block measurement time instances indicated by a new periodicity associated with a block measurement time configuration window, or an adapted configuration is applied for synchronization signal block measurement time instances indicated by a new window duration associated with at least one of a block measurement time configuration window or offset, wherein the adapted configuration is applied when a location of the user equipment one of remains within specific geographical boundaries or is estimated to be in a specific location of the communication network or under a coverage of certain signals, wherein the coverage is based on cell quality (one or more) synchronization signal block or (one or more) or channel state signal quality meets the relative or absolute signal quality threshold condition for duration of time, wherein the adapted measurement configuration is applied, when an activation of transmission configuration for physical downlink control channel is indicated for the user equipment, for determining one of: a channel state information reference signal based adaptation, a synchronization signal block based adaptation, or a synchronization signal block based adaptation, wherein the at least one condition is one of determined by the user equipment or provided by the communication network.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In the example embodiments of the invention, there is proposed a novel configuration at a user equipment of a set of synchronization signal blocks in a block measurement time configuration window using a mask list configuration for at least energy savings by the user equipment.

As similarly indicated above, a new study item in NR release 16, aims to find techniques to reduce UE power consumption to improve the energy efficiency of 5G NR UEs (specified in Release-15). One of the proposed study aspects for reducing UE power consumption was for RRM measurements. In this regard it was considered that RRM measurements would consume lot of power and mechanisms to reduce the consumption needs to be studied.

NR Measurement configuration

In NR, UE may be configured to perform RRM or in more general mobility measurements for inter-cell mobility referred typically as RRM (Radio Resource Management) measurements or Layer 3 mobility as RRC, Radio resource Control, signalling is involved as well as on intra-cell mobility (referred typically as beam management) on SS/PBCH Block, or simply Synchronization Signal Block (SSB), and CSI-RS signals. Signals used for either L3 mobility or beam management are explicitly configured.

It is noted that the SSB refers to SS/PBCH block because Synchronization signal and PBCH channel are packed as a single block that moves together. Components of this SS/PBCH block include:

Synchronization Signal: PSS (Primary Synchronization Signal), SSS (Secondary Synchronization Signal); and PBCH: PBCH DMRS and PBCH (Data)

For beam management purposes and L3 mobility purposes the CSI-RS signals are separately configured i.e. the actual signals, measurements and reporting configurations are of different configuration. For beam management purposes UE is configured with NZP-CSI-RS (non-zero-power) and for L3 mobility purposes UE is configured with CSI-RS for Mobility.

The SS/PBCH block enables a UE to measure and identify a best antenna beam for a UE. For example in the SS/PBCH block:

There can be Synchronization Signals including a PSS (Primary Synchronization Signal) and/or SSS (Secondary Synchronization Signal);

Multiple SSBs can be transmitted with a certain interval;

Each SSB is identified by a unique number called SSB index;

Each SSB is transmitted via a specific beam radiated in a certain direction;

UE, such as of multiple UE is a particular location, measures the signal strength of each SSB it detects for a certain period (e.g., a period of one SSB Set); and From a measurement result UE identifies the SSB index with the strongest signal strength that is the best beam for use by the UE.

Further, the SSB signals can be used for both beam management and L3 mobility measurement purposes with the difference that for beam management the SSB for measuring and reporting L1-RSRP are explicitly configured and in current specifications it concerns only the serving cell SSBs whereas for L3 mobility purposes the SMTC window determines the time duration and to-be-measured SSB time locations where UE measurements SSBs of all cells in the frequency layer.

It is noted that according to 38.215 section 5.1.1 SS reference signal received power (SS-RSRP) the SS reference signal received power (SS-RSRP) is defined as the linear average over the power contributions (in [W]) of the resource elements that carry secondary synchronization signals (SS). The measurement time resource(s) for SS-RSRP are confined within SS/PBCH Block Measurement Time Configuration (SMTC) window duration. If SS-RSRP is used for L1-RSRP as configured by reporting configurations as defined in 3GPP TS 38.214 [6], the measurement time resources(s) restriction by SMTC window duration is not applicable.

For SS-RSRP determination demodulation reference signals for physical broadcast channel (PBCH) and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals as defined in 3GPP TS 38.213. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity. If SS-RSRP is not used for L1-RSRP and higher-layers indicate certain SS/PBCH blocks for performing SS-RSRP measurements, then SS-RSRP is measured only from the indicated set of SS/PBCH block(s).

For a frequency range 1, the reference point for the SS-RSRP shall be the antenna connector of the UE. For a frequency range 2, SS-RSRP shall be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches. Where frequency range 1 and 2 refer to frequency ranges defined in TS 38.101.

Similar as in LTE, in NR, UE can be configured with S-measure, an RSRP threshold value used for determining whether UE is required to perform evaluation for RRC level measurement reporting events for non-serving cells. When configured with s-measure and the cell quality is measured to be less than a threshold after L3 filtering, UE shall perform evaluation for reporting events. When the cell quality is higher UE is not required to evaluate event i.e. it is not required to perform measurements for RRC level events for non-serving cells. As a different to LTE, the cell quality can be derived and determined either using SSB or CSI-RS measurements, NR release 15 specifies the s-measure configuration option for both types of reference signals.

QCL, Quasi Co-location Assumption (e.g., in 3GPP TS 38.213/214) When two different signals share the same QCL type, they share the same indicated properties. As an example, the QCL properties may include delay spread, average delay, Doppler spread, Doppler shift, spatial RX. QCL type A means Doppler spread, Doppler shift, delay spread, and/or average delay, and QCL type D means spatial RX. Currently 38.214 lists following QCL types:
'QCL-T A': {Doppler shift, Doppler spread, average delay, delay spread}
'QCL-T B': {Doppler shift, Doppler spread}
'QCL-T C': {Doppler shift, average delay}
'QCL-T D': {Spatial Rx parameter}
As a further example if a CSI-RS and SSB have the type D QCL assumption between each other, it means that UE may utilize same RX spatial filter (beam) to receive these signals.

SMTC Window (SS/PBCH Block Measurement Timing Configuration)

The SMTC window defines the time duration and periodicity for SSB based RRM measurements. UE can be given SMTC window for IDLE mode measurements (smtc) as well as for the CONNECTED mode two separate configurations (stmc1, smtc2).

SMTC/SMTC1

Primary measurement timing configuration, indicates the periodicity and offset value for the SMTC window as well as the duration in subframes.

STMC2

Secondary measurement timing configuration for SSBs corresponding to with specific PCIs listed in the configuration. For the SSBs indicated in the SSB-tomeasure the second/alternative periodicity is indicated by periodicity in smtc2. Periodicity in smtc2 can only be set to a value shorter than the periodicity of the smtc1. As an example if the smtc1 periodicity is configured as sf10, the periodicity of smtc2 can only be set to sf5. Smtc2 uses the offset and duration value of smtc1.

Figure 1A:
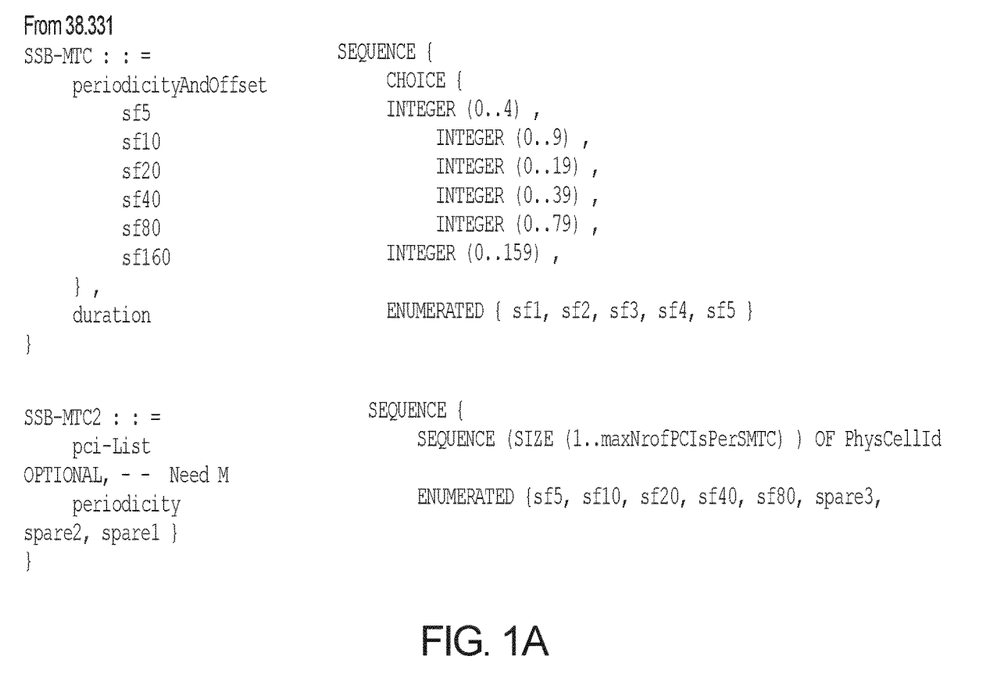
FIG. 1A shows operations of an SSB-MTC information element as per 3GPP TS 38.331 V15.3.0 (2018-09.

FIG. 1A shows in 3GPP TS 38.331 V15.3.0 (2018-09) an IE SSB-MTC is used to configure measurement timing configurations, i.e., timing occasions at which the UE measures SSBs. In FIG. 1A a duration of the measurement window in which to receive SS/PBCH blocks is given in number of subframes. In addition, a periodicity and offset of the measurement window in which to receive SS/PBCH block are given in number of subframes, the timing offset and duration can be as provided in smtc1.

The set of SS blocks to be measured within the SMTC measurement duration. The first/leftmost bit corresponds to SS/PBCH block index 0, the second bit corresponds to SS/PBCH block index 1, and so on. Value 0 in the bitmap indicates that the corresponding SS/PBCH block is not to be measured while value 1 indicates that the corresponding SS/PBCH block is to be measured.

If UE is not configured using the field SSB-toMeasure, UE measures on all SS block time locations in the configured SMTC window. SS/PBCH blocks that are not located inside the SMTC window i.e. are outside of the applicable smtc, are not to be measured for RRM purposes.

Figure 1B:
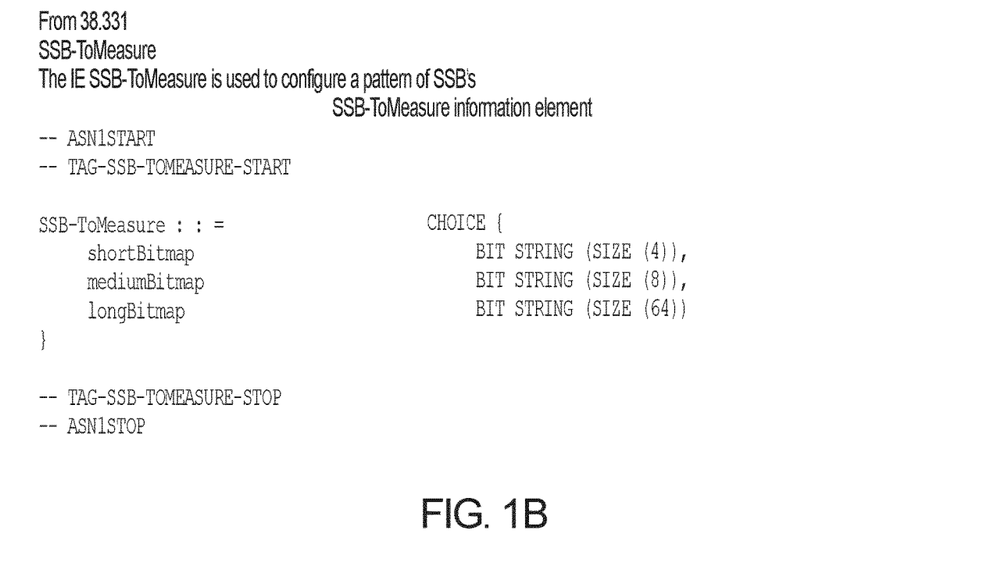
FIG. 1B shows operations of an SSB-ToMeasure information element as per 3GPP TS 38.331 V15.3.0 (2018-09.

FIG. 1B shows SSB-ToMeasure information element according to 3GPP TS 38.331 V15.3.0 (2018-09) for use to configure a pattern of SSBs. For the SSB-ToMeasure there is field descriptions to indicate:
a longBitmap for bitmaps above 6 gHZ;
a mediumBitmap for bitmaps between 3-6 gHZ; and
a shortBitmap for bitmaps sub or below 3 gHZ.

In standards submissions at the time of this application a network may indicate to a UE the occupied SSB time locations within the SMTC window using a bitmap (SSB-toMeasure). This bitmap applies for the RRM measurements on the same frequency layer i.e. it contains all the occupied SSB time locations of all the cells in the frequency layer.

In these operations a UE may be provided with specific slots where UE is not required to perform RRM measurements on SSB signals. Further, in such submissions the Solution provides no details how to determine the subslots and when to apply the configuration for reduced subslots for RRM i.e. currently network can control UE measurements per frequency layer by broadcasting SMTC window and SSB-toMeasure for IDLE mode. Further, the SMTC/SSB-toMeasure is applied frequency layer specifically such that there can be a fuller potential of reduction in RRM measurements based on individual beam configurations of cells and UE location in the cell.

Example embodiments of the invention work to improve these operations associated with a block measurement time configuration window at user equipment by at least applying a mask list configuration for at least a further increase in at least energy savings by the user equipment.

Figure 2:
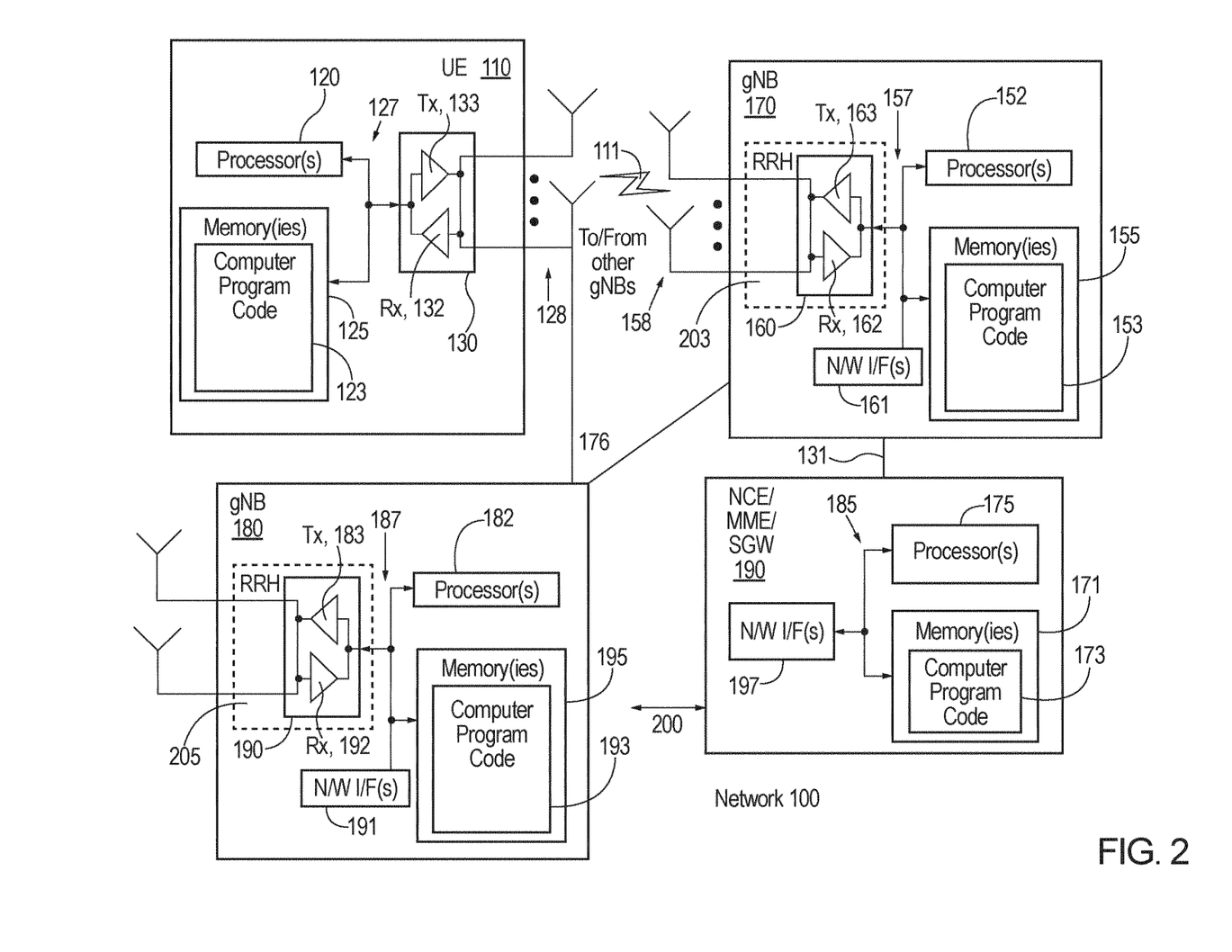
FIG. 2 shows a high level block diagram of various devices used in carrying out various aspects of the invention.

Before describing the example embodiments of the invention in further detail reference is made to FIG. 2 for illustrating a simplified block diagram of various electronic devices that are suitable for use in practicing the example embodiments of this invention. FIG. 2 shows a block diagram of one possible and non-limiting exemplary system in which exemplary embodiments of the invention may be practiced. In FIG. 2, a user equipment (UE) 110 is in wireless communication with a wireless network 100. A UE is a wireless, typically mobile device that can access a wireless network. The UE 110 includes one or more processors 120, one or more memory(ies) 125, and one or more transceivers 130 interconnected through one or more buses 127. Each of the one or more transceivers 130 includes a receiver Rx, 132 and a transmitter Tx 133.

The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more transceivers 130 have multi-connectivity configurations and communicate over the wireless network 100 or any other network. The one or more memories 125 include computer program code 123 executed by the one or more processors 120. The one or more processors 120 may be implemented also as an integrated circuit or through other hardware such as a programmable gate array. For instance, the one or more memory(ies) 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memory(ies) 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158.

The one or more memory(ies) 155 include computer program code 153. For instance, the one or more memory(ies) 155 and the computer program code 153 are configured to cause, with the one or more processors 152, the gNB 170 to perform one or more of the operations as described herein. The one or more memories 155 include computer program code 153 executed by the one or more processors 152. The one or more processors 152 may be implemented also as an integrated circuit or through other hardware such as a programmable gate array. The one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface. Further the links 176 may be through other network devices such as, but not limited to an NCE/MME/SGW device such as the NCE/MME/SGW 190 of FIG. 2.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

The gNB 180 (NR/5G Node B or possibly an evolved NB) is a base station such as a master node base station (e.g., for NR or LTE long term evolution) that communicates with devices such as the gNB 170 and/or UE 110 and/or the wireless network 100. The gNB 180 includes one or more processors 182, one or more memories 195, one or more network interfaces (N/W I/F(s)) 191, and one or more transceivers 190 interconnected through one or more buses 187. Each of the one or more transceivers 190 includes a receiver Rx 192 and a transmitter Tx 183. The one or more transceivers 190 are connected to one or more antennas 185. The one or more transceivers 190 have multi-connectivity configurations and communicate over the wireless network 100 or any other network. The one or more memories 195 include computer program code 193 executed by the one or more processors 182. The one or more processors 182 may be implemented also as an integrated circuit or through other hardware such as a programmable gate array. The one or more memories 155 and the computer program code 193 are configured to cause, with the one or more processors 182, the gNB 180 to perform one or more of the operations as described herein. The one or more network interfaces 181 communicate over a network such as via the links 176. Two or more gNB 170 or gNB 180 may communicate with another gNB and/or eNB or any other device using, e.g., links 176. The links 176 maybe wired or wireless or both and may implement, e.g., an X2 interface. Further, as stated above the links 176 may be through other network devices such as, but not limited to an NCE/MME/SGW device such as the NCE/MME/SGW 190 of FIG. 2.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH. The gNB 180 is coupled via a link 200 to the NCE 190. Further, the gNB 180 is coupled via links 176 to the gNB 170. The links 131, 176, and/or 200 may be implemented as, e.g., an S1 interface It is noted that description herein indicates that "cells" perform functions, but it should be clear that the gNB that forms the cell will perform the functions. The cell makes up part of a gNB. That is, there can be multiple cells per gNB.

The wireless network 100 may include a network control element, mobility Management Entity, and/or serving gateway (NCE/MME/SGW) 190 that may include MME (Mobility Management Entity)/SGW (Serving Gateway) functionality, such as User Plane Functionalities, and/or an Access Management functionality for LTE and similar functionality for 5G, and which provides connectivity with a further network, such as a telephone network and/or a data communications network (e.g., the Internet). The gNB 170 is coupled via a link 131 to the NCE/MME/SGW 190. The link 131 may be implemented as, e.g., an S1 interface. The NCE/MME/SGW 190 includes one or more processors 175, one or more memory(ies) 171, and one or more network interfaces (N/W I/F(s)) 197, interconnected through one or more buses 185. The one or more memory(ies) 171 include computer program code 173. The one or more memory(ies) 171 and the computer program code 173 are configured to, with the one or more processors 175, cause the NCE/MME/SGW 190 to perform one or more operations which may or may not be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memory(ies) 155 and 171, and also such virtualized entities create technical effects.

The computer readable memory(ies) 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memory(ies) 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium or other device that may be any media or means that can contain or store the instructions for use by or in connection with an instruction execution system, apparatus, or device, such as a computer.

In accordance with an example embodiment of the invention there is proposed an SSB specific mask or list to be applied for RRM purposes. This mask or list can be applied instead or addition of the SSB-toMeasure. The SSB specific list indicates per SSB, which SSB time locations UE is allowed ignore in inside the SMTC window (or similarly determine time locations where it is required to measure SSBs for RRM purposes), or measure with relaxed periodicity, when specific conditions apply. In alternative example mask or list could indicate per SSB, which SSB time locations UE is not allowed to ignore or measure with relaxed periodicity, when specific conditions apply.

In accordance with example embodiments of the invention the novel application of these conditions includes:
  where the condition may be signal quality based condition, determined from measurement on at least one SSB or CSI-RS (beam management or L3 mobility);
  where the condition may be signal quality based condition, determined from measurement on at least one, subset or all SSB, or at least one, subset or all CSI-RS (beam management or L3 mobility), of a predefined set, meeting or exceeding predefined absolute or/and relative threshold(s). In one example the signal quality based condition needs to apply for specific period of time, for one, subset or all of the selected measurement quantities/metrics;
  where the condition may be a network configuration (network provides the mask) and apply as long as the network deconfigures it. The mask would be applied on top of SSB-toMeasure (of configured) or the SSB time locations in SMTC window. Configuration could be temporary i.e. the base configuration for RRM measurements does not change;
  where the condition may be a timer based: it applies for the duration of a configured time period;
  where the mask may be applied when UE location remains within specific geographical boundaries or is estimated to be in specific location in a cell based on L1 RSRP/SS-RSRP measurements;
  In one example the condition could be determined as certain selected/configured SSB(s) to meet the set signal quality based condition for certain period of time e.g. configured SSB has been the strongest/best in terms of signal level/quality for a certain period of time or within relative threshold of the strongest or above absolute threshold.
  where condition may apply on RRC CONNECTED state, RRC INACTIVE state or RRC IDLE state; and/or
  the mask configuration may also indicate the periodicity when the SSB specific mask is applied:
    The SSB specific mask is applied for all the STMC window instances (the periodicity is not changed
    Or it applies only for instances indicated by the new periodicity in the configuration. When the new periodicity does not apply UE measures according to SSB-toMeasure (if configured) i.e. if the instances of new periodicity and current SMTC periodicity overlap, the mask is applied. Effectively this would imply that the required measurement periodicity for the SSBs indicated by the mask would be allowed to be relaxed.
      In one alternative embodiment, alternative SMTC configuration (with longer periodicity) would be applied to the SSBs indicated by the mask list (or inverse of the mask list)
    Or when the mask periodicity changes also the SMTC window periodicity when the mask applies.
  In one option the condition may apply based on cell quality measurements and the specific SSBs/CSI-RS used to derive the cell quality. Cell quality may be derived based on N-highest quality SSB/CSI-RS where the N may be '1' i.e. highest would be used, or N above absolute threshold; and/or
  In all the options described herein if UE can apply multiple masks (based on multiple SSBs or CSI-RSs fulfilling the condition) UE may choose to select any of the mask fulfilling the conditions or the mask that provides the most relaxation or energy saving for RRM measurements. Similarly if a set of SSBs or CSI-RS may share the same mask UE may have multiple sets for which the conditions apply and UE may select one of the mask or masks providing the most potential for energy saving i.e. mask providing UE with most relaxed RRM measurement configuration (assuming that UE would measure less signals or measure less frequently, it would provide energy saving from RRM measurement perspective.)

In accordance with another example embodiment of the invention there is proposed to determine, based on SSB or CSI-RS specific mask or list that is applied, a scaling factor or applying offset to the S-measure threshold. The mask configuration (or separate configuration) may include mask specific offset to be applied for the S-measure threshold. When the S-measure is configured (as in prior art) and UE has determined that serving cell quality is above the S-measure threshold, it does not have to measure other than serving cell for RRM (i.e. it does not have to evaluate reporting criteria for non-serving cells). When UE has determined that specific mask or configuration to adapt RRM measurements applies and an offset value for adapting S-measure threshold level is associated with the applied mask/configuration UE determines the applied/or new S-measure threshold by considering the offset value when evaluating whether S-measure is applied. Offset may be applied to measured cell quality or applied to the S-measure value. Alternatively, the new value may be an absolute signal quality threshold. This value may be used similarly as S-measure i.e. if the cell quality or the cell quality based on the reference signals indicated in the mask/configuration is above the threshold, UE is not required to perform RRM measurements on non-serving cells. Offset/absolute value is configured by network or is pre-determined and can be negative, zero, or positive value applied (e.g. −3, 0, 3 dB or dBm). In alternative or additional way network may configure or indicate UE with specific set of reference signals (SSB or CSI-RS). These sets may be labeled as Set 1, Set 2 etc. Set 1 may have SSB indexes #0 . . . #1 and Set 2 SSB indexes #2 . . . #3. These sets may also correspond to specific areas in a cell such as A, B, C as in FIG. 3 but are not limited to those. Each set of reference signals are associated with an offset value (or an absolute threshold) configured by network or predefined. When UE has determined that it is under coverage area of a specific set (e.g. Set 1 or Set 2) of reference signals, or it determines which set can be considered valid or active or to be used as reference for determining the use of offset (i.e. any of the conditions described herein the document may be used to determine is a set is use similarly as it is determined whether a specific mask is applied), it applies the offset associated with the Set (e.g. Set 1 offset or Set 2 offset) to determine whether S-measure applies. Similarly, the offset may be applied to S-measure or the derived cell quality used for S-measure evaluation. In case the set is associated with an absolute threshold value, the measured cell quality is compared to that with similar conditions as for the S-measure i.e. if the cell quality is higher than threshold, UE is not required to perform RRM measurement on non-serving cells. The offset value may also cell quality may be derived in normal manner or based on the applied set of reference signals. One benefit of applying the offset is that e.g. in specific conditions (as an example UE is in cell center close to the gNB/TRP) the RRM measurements are triggered later that in conditions where UE is located at the cell edge, where the RRM measurement may be considered to be more important due to potential handovers/cell reselection etc. This merely an example of the benefit. In any of the above cases, a hysteresis may be applied when evaluating thresholds.

Figure 3:
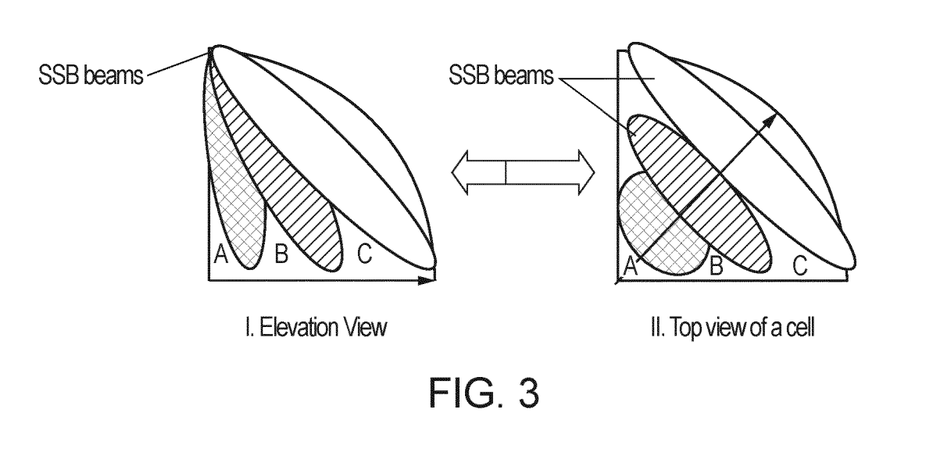
FIG. 3 shows an elevation view and a top view of a cell beam configuration, (e.g., where multiple SSB or CSI-RS beams are illustrated)

In accordance with the conditions above there is, based on the beam configuration and deployment in the network (i.e., how the beams are transmitted in given frequency layer/cell group of cells and/or taking into account neighbor cell and UE location in the cell when beams may be transmitted in multiple elevation angles (e.g., FIG. 3) the UE can be enabled for power saving by configuring UE to measure subset of SSBs/CSI-RS for RRM/L3 mobility purposes when UE can be assumed to be in specific geographical area or UE can be enabled for reducing measurements when NW configured conditions apply. FIG. 3 is only an example illustration of a beam deployment of one cell, FIG. 3 shows an elevation view and a top view of a cell beam configuration. As shown in FIG. 3 for the cell beam configuration there are three areas in a cell covered by SSB or CSI-RS beams Three areas/zones are labeled as A, B, and C. Beams in area A may example illustrate area corresponding to close distance to or near the gNB (or a TRP, transmission reception point) Area B the medium distance and Area C the long distance or cell edge area of gNB. These areas are only an example how the set of beams are labeled may be determined to be in (i.e. there may be multiple areas or just a single area). In one example the set of beams (SSB or CSI-RS identified by index or resource index or identifier) may be categorized to be different sets in various ways e.g. set of beams of area A and B may all be determined to area A beam and so on. In one example the beams may be determined to be in specific sets indicated by network. Set 1, may include SSB/CSI-RS index x . . . y, set 2 z . . . q and so on). FIG. 3 illustrates an example that multiple beams may be used to cover cell in azimuth and elevation dimensions.

Applying the SSB Specific Mask

Figure 4A:
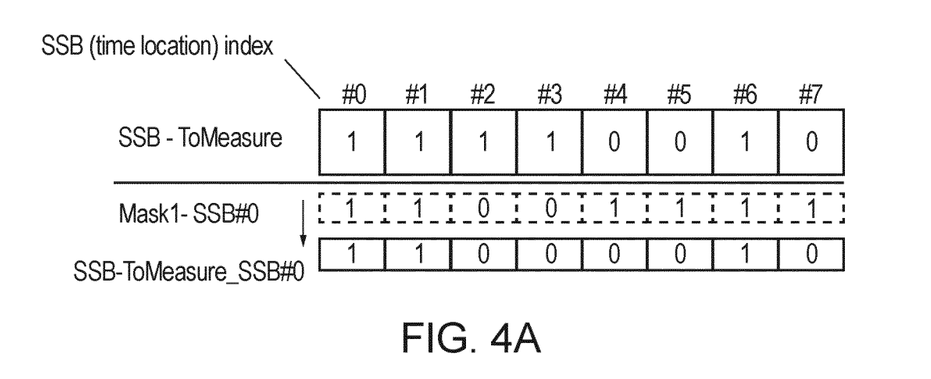
FIG. 4A and FIG. 4B each show an AND operation in accordance with the example embodiments of the invention between Mask# and SSB-toMeasure to obtain an SSB specific SSB-toMeasure.
Figure 4B:
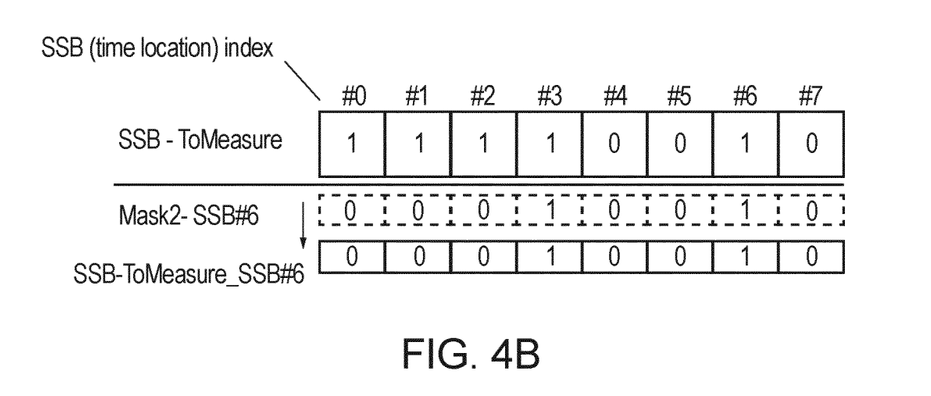

FIG. 4A and FIG. 4B each illustrate an application of SSB specific mask for SSB-toMeasure. Two example masks (Mask1-SSB#0 as in FIG. 4A, and Mask2-SSB#6 as in FIG. 4B) are provided for SSB-toMeasure bitmap length of 8 bits. As shown in FIG. 4A, when UE has been configured with Mask1 and it has determined that the mask can be applied it applies the Mask1(a bitmap of SSB time locations) to current SSB-toMeasure. In similar manner, as shown in FIG. 4B when SSB#6 is selected or determined that the Mask2 applies, UE applies the SSB#6 specific mask. Then the resulting bitmap indicates the SSB time locations in the SMTC window that UE is required to measure. As indicated in FIG. 4A and FIG. 4B the integer 0 of the mask are imposed on the SSB-ToMeasure such that the mask value 0 can replace the SSB-ToMeasure value. It should be understood that although throughout the invention although examples are given in the context of using SSB-toMeasure bitmap, the invention can be applied to SSB location in the SMTC window. If no 'generic' SSB-toMeasure is provided by the network, the UE would apply only the SSB specific mask to determine the SSB locations in the SMTC window for which the change in measurement behaviour/requirement is applied.

In accordance with example embodiments of the invention as similarly stated above, a value 0 in the bitmap indicates that the corresponding SS/PBCH block is not to be measured while value 1 indicates that the corresponding SS/PBCH block is to be measured.

The application of the mask can be simply AND operation between Mask# and SSB-toMeasure to obtain the SSB specific SSB-toMeasure.

In an additional specified aspect in accordance with example embodiments of the invention the network may provide UE the temporary SSB mask based on the L1-RSRP/SS-RSRP for L3 mobility measurements on current serving cell or other cells on the frequency.

When the mask applies, UE is not required to measure SSBs on specific locations or is required to measure only using the specific configuration given in the mask.

In an additional specific aspect in accordance with the example embodiments, the mask or list could also include frequency level information, used to determine the need (or lack of) to perform measurements or relax/adjust the measurement periodicity on SSBs having different center frequency.

In accordance with example embodiments of the invention, in any of the options as described in the standards or herein:

the network may provide UE the temporary SSB mask based on the L1-RSRP/SS-RSRP for L3 mobility measurements on current serving cell or other cells on the frequency;

a timer may be used to determine the validity of the configured list. Timer is started when UE obtains the list from network. When the timer is running and another condition for reducing RRM measurement is fulfilled, UE applies the mask. When the timer expires UE is not allowed to apply the SSB mask configuration for RRM measurements; and/or SSB mask/list may be a cell specific or cell group specific or applied for configured list of cells i.e. the signaling may differentiate mask per cell or multiple cells and individual SSBs of a cell. In multicell/cell group case, UE determines the SSB mask based on SSB time location index and physical cell ID.

In one further aspect example embodiments of the invention may be applied additionally or alternatively for Mobility CSI-RS (L3) signals.

In one further aspect example embodiments of the invention may be applied for specific cell or set of cells including intra-frequency, inter-frequency, and carrier aggregation. Cell may be a serving cell (PCell or SCell) and set of cells may include the serving cell.

Non-limiting example procedure in IDLE state or INACTIVE state in accordance with example embodiments of the invention:

When UE is configured with SSB specific mask/list it determines the SSB-toMeasure inside the SMTC window as follows in IDLE state or INACTIVE state:
- UE determines the current SSB index of a cell it is camping on that it uses for determining the timing and spatial RX relation (RX beam) for paging and system information reception (e.g. FR2);
- UE determines if SSB specific mask/list has been provided for the current SSB;
- If the measured quality in terms of SS-RSRP or SS-RSRQ is above network configured threshold level threshold_ssb_mask UE applies the SSB specific mask for SSB measurements for RRM purposes;
- If UE does not have mask for the selected SSB, it applies only SSB-toMeasure (if configured) and performs RRM measurement accordingly; and/or
- IDLE mode mask may be configured for UE in RRC connected mode or given in system information. If UE selects a cell for camping that does not provide any mask configuration in system information or UE does not have mask for the specific cell the mask is not applied.

Non Limiting Example Procedure In CONNECTED Mode

When UE is configured with SSB specific mask/list it determines the SSB-toMeasure inside the SMTC window as follows in CONNECTED mode:
- Option 1. If SSB is configured as TCI state for PDCCH, or it is a QCL source for the reference signal defined as a TCI state (CSI-RS or TRS or any signal that can be a TCI state), UE determines the current SSB index it is configured with SSB specific mask it may apply the mask and reduce RRM measurements during STMC window;
- Option 2. if at last one SSB which is configured for L1-RSRP measurements or indicated in the SSB-toMeasure is above threshold_ssb_mask (either RSRP or RSRQ or SINR) and UE has an SSB specific mask for the said SSB, it is allowed to apply the mask for SSB RRM measurements;
- Option 3. If a The CSI-RS configured as TCI state for PDCCH or the QCL source of the reference signal defined as a TCI state PDCCH (CSI-RS or TRS or any signal that can be a TCI state), it is used to determine the use of CSI-RS specific mask.
- Network may also provide UE with "temporary mask" not specific to any SSB but is applied for the current SSB-toMeasure configuration (or instead of SSB-toMeasure, if any). This may be valid for a specific time duration, or until UE enters IDLE mode, configured with new TCI state or until network deconfigure it; and
- If UE does not have mask for the selected/specific SSB, it applies only SSB-toMeasure and performs RRM measurement accordingly.

CSI-RS signals for Determining Measurement/Mask Configuration(s)

It should be understood that any condition and associated/triggered measurement configuration or adaptation modification (that are described for SSBs herein the document) can be based on CSI-RS for beam management or CSI-RS for mobility (L3 mobility, or cell level mobility). Also any resulting/affected measurement configuration can then be applied to either CSI-RS for beam management or CSI-RS for mobility when configured by network or determined by UE.

When configured by network and determined optionally by UE, UE is allowed to ignore mobility CSI-RS measurements for specific or all CSI-RS signals for RRM/L3 mobility purposes. Alternative way to describe this operation is that UE applies alternative measurement configuration based on specific condition where the alternative measurement configuration may be temporary configuration. When the temporary configuration does not apply, UE determines to use the configuration (this may be referred as normal configuration i.e. when no adaptation of modification is applied to measurement configuration)

Alternatively, UE is indicated the CSI-RS for mobility which UE is required to measure when specific condition applies. In yet one alternative, UE either completely allowed to ignore measurements on specific CSI-RS signals or the measurement period may be changed so that the measurement period requirement is relaxed. This allows UE to perform less frequently measurements on specific CSI-RS signals or even all the CSI-RS signals when a condition applies. Performing measurements in less frequent manner enables UE power saving.

As an example of specific condition when to apply mask list or list or configuration for reduced CSI-RS measurements for mobility
- Opt.1: An SSB specific mask may be used to determine the CSI-RS measurement pattern/periodicity. In case the CSI-RS signals are associated with SSB transmission (e.g. by configuration) and SSB mask as described in this invention indicates that UE is not required to measure the said SSB time location index, UE is allowed ignore the specific associated CSI-RS from RRM perspective or apply reduced measurement periodicity.
- Opt.1a: An SSB or CSI-RS configuration specific mask may be used to determine the CSI-RS measurement pattern/periodicity, additionally or alternative when CSI-RS are not associated with SSB.Opt2. If a specific CSI-RS (for beam management) is configured as an active TCI state for PDCCH and network has provided specific mobility CSI-RS measurement configuration associated to specific CSI-RS (for beam management) UE may apply the configuration when the TCI state is indicated to be active by network.
- Opt3: When a signal quality level of a CSI-RS for beam management or L3 mobility is above a predefined/configured signal quality threshold and associated measurement configuration is provided for UE or obtained by UE, it may apply the measurement configuration mask to reduce RRM or beam management measurements.

Opt4: Explicitly activated or configured by network.

CSI-RS based RRM measurements may further be considered together other measurement reduction methods such as a condition where a CSI-RS for mobility is associated to specific SSB (SSB time locations index and/or a specific cell) and if the SSB is not detected (e.g. signal quality may be too low), UE is not required to measure the associated CSI-RS.

In one implementation aspect example embodiments of the invention may be applied for intra-cell beam management measurements (with specific signaling). i.e. UE is configured to report L1-RSRP on specific SSB and or NZP-CSI-RS and network provides additional temporary configuration for overriding the current measurements; and/or In one further aspect, the mask may be applied by UE as long as signal quality specific thresholds apply for a specific signal (CSI-RS/SSB) or UE location remains within specific geographical boundaries (e.g. based on positioning measurements or GPS), Or configured by network when UE is estimated to be in specific location in a cell based on L1 RSRP measurements/SS-RSRP measurements.

In accordance with example embodiments ofthe invention there, depending on the configuration if the UE is indicated as configured with CSI-RS signalling there is determined a measurement/mask pattern for applying to the CSI-RS signals or SSB signals. Alternatively an SSB pattern may be indicated by the network to the UE such that the UE may determine to use SSB pattern or determine CSI-RS measurement configuration (mask list) based on the indicated SSB.

Figure 5:
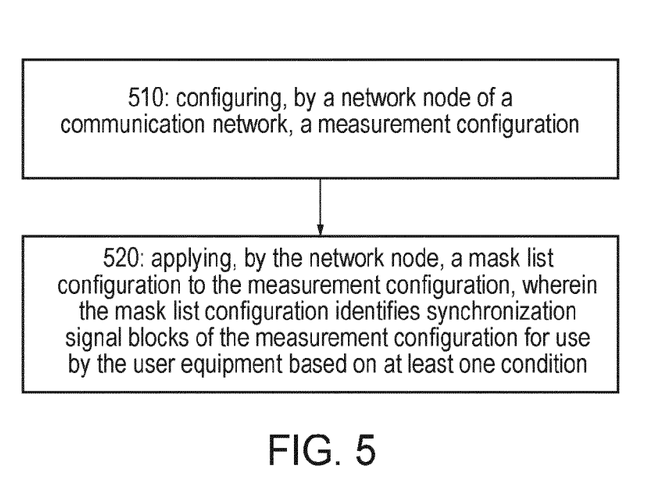
FIG. 5 shows a method in accordance with example embodiments of the invention which may be performed by an apparatus.

FIG. 5 shows a method in accordance with example embodiments of the invention which may be performed by an apparatus. FIG. 5 illustrates operations which may be performed by a device such as, but not limited to, a device such as the gNB 170 and/or gNB 180 and/or UE 110 as in FIG. 2. As shown in step 510 of FIG. 5 there is configuring, by a network node of a communication network, a measurement configuration. Then as shown in step 520 of FIG. 5 there is applying, by the network node, a mask list configuration to the measurement configuration, wherein the mask list configuration identifies synchronization signal blocks of the measurement configuration for use by the user equipment based on at least one condition.

In accordance with the example embodiments as described in the paragraph above, wherein the block measurement time configuration window is configured for use in at least one of beam management and L3 mobility by the user equipment in the at least one cell of the communication network.

In accordance with the example embodiments as described in the paragraphs above, wherein the measurement configuration is a block measurement time configuration window comprising a set of synchronization signal blocks for use by at least one user equipment in at least one cell of the communication network.

In accordance with the example embodiments as described in the paragraphs above, wherein the measurement configuration is a channel state information reference signal configuration.

In accordance with the example embodiments as described in the paragraphs above, wherein based on the user equipment being configured to use channel state information reference signalling for measurements, the mask list configuration is applied to the channel state information reference signalling to indicate the user equipment is to one of use or ignore channel state information reference signalling based on the at least one condition.

In accordance with the example embodiments as described in the paragraphs above, wherein the at least one condition comprises at least one of: a signal quality condition exceeding a threshold, and a timer based condition indicating a configured time period duration for the applying.

In accordance with the example embodiments as described in the paragraphs above, wherein the signal quality condition is based on one of a synchronization signal block signal quality condition, and a channel state information reference signal quality condition.

In accordance with the example embodiments as described in the paragraphs above, wherein the at least one condition is one of determined by the user equipment or provided by the communication network.

In accordance with the example embodiments as described in the paragraphs above, wherein the mask list configuration is applied over the set of synchronization signal blocks, and wherein applying the mask list configuration does not change a radio resource management measurement configuration at the user equipment.

In accordance with the example embodiments as described in the paragraphs above, wherein the mask list configuration is applied when a location of the user equipment one of remains within specific geographical boundaries or is estimated to be in a specific location of the communication network or under a coverage of certain signals.

In accordance with the example embodiments as described in the paragraphs above, wherein the mask list configuration is applied, when an activation of transmission configuration for physical downlink control channel is indicated for the user equipment, for determining one of: a CSI-RS signal based mask, a synchronization signal block based mask, and a synchronization signal block based mask.

In accordance with the example embodiments as described in the paragraphs above, wherein the synchronization signal is determined using the quasi co-location assumption between channel state information reference signal and said synchronization signal blocks.

In accordance with the example embodiments as described in the paragraphs above, wherein based on a beam configuration at the location of the user equipment, the user equipment is configured to measure only a subset of the set of synchronization signal blocks.

In accordance with the example embodiments as described in the paragraphs above, wherein the location of the user equipment is determined using at least one of an L1 reference received signal power measurement and a synchronization signal reference received signal power measurement.

In accordance with the example embodiments as described in the paragraphs above, wherein the at least one condition is configured to be applicable only during one of an idle mode (RRC_IDLE state), inactive (RRC_INACTIVE state) or a connected mode (RRC_CONNECTED state) of the user equipment.

In accordance with the example embodiments as described in the paragraphs above, wherein the mask list configuration indicates a periodicity of applying the mask list configuration, wherein the periodicity comprises at least one of: the mask list configuration is applied for all synchronization signal block measurement time instances associated with the block measurement time configuration window, and the mask list configuration is applied for synchronization signal block measurement time instances indicated by a new periodicity associated with the block measurement time configuration window, and the mask list configuration is applied for synchronization signal block measurement time instances indicated by a new window duration associated with the block measurement time configuration window and/or offset, In accordance with the example embodiments as described in the paragraphs above, mask list configuration applied for synchronization signal block measurement time instances reduces also the duration of the measurement timing window where the reduced window duration is determined based on the synchronization signal block locations indicated in the mask list.

In accordance with the example embodiments as described in the paragraphs above, wherein based on instances of the new periodicity and current synchronization signal block measurement time instance periodicity overlapping the mask list configuration is applied.

In accordance with the example embodiments as described in the paragraphs above, wherein the example embodiment may be used additionally or alternatively based on condition of UE mobility state, where the UE mobility state may be determined to be low (or medium or high) or stationary, and wherein the mobility state is determined by the network or by the UE, autonomously or based on some predefined rules or by network and indicated to UE.

It should be understood that any condition of methods described herein the embodiments and examples can be considered in another embodiments in combination in non-limiting manner.

A non-transitory computer-readable medium (Memory(ies) 155 and/or Memory(ies) 195 and/or Memory(ies) 125 as in FIG. 2) storing program code (Computer Program Code 153 and/or Computer Program Code 193 and/or Computer Program Code 123 as in FIG. 2), the program code executed by at least one processor (Processor(s) 152 and/or Processors 182 and/or Processor(s) 120 as in FIG. 2) to perform the operations as at least described in the paragraphs above.

In accordance with an example embodiment of the invention as described above there is an apparatus comprising: means for configuring (Memory(ies) 155 and/or Memory(ies) 195 and/or Memory(ies) 125; Computer Program Code 153 and/or Computer Program Code 193 and/or Computer Program Code 123; and Processor(s) 152 and/or Processors 182 and/or Processor(s) 120 as in FIG. 2), by a network node (gNB 180 and/or gNB 170 and/or UE 110 as in FIG. 2) of a communication network (Network 100 as in FIG. 2), a measurement configuration. Then means for applying (Memory(ies) 155 and/or Memory(ies) 195 and/or Memory(ies) 125; Computer Program Code 153 and/or Computer Program Code 193 and/or Computer Program Code 123; and Processor(s) 152 and/or Processors 182 and/or Processor(s) 120 as in FIG. 2), by the network node (gNB 180 and/or gNB 170 and/or UE 110 as in FIG. 2), a mask list configuration to the measurement configuration, wherein the mask list configuration identifies synchronization signal blocks of the measurement configuration for use by the user equipment based on at least one condition.

In the example aspect of the invention according to the paragraphs above, wherein at least the means for configuring and applying comprises a non-transitory computer readable medium [Memory(ies) 155 and/or Memory(ies) 195 and/or Memory(ies) 125 as in FIG. 2] encoded with a computer program [Computer Program Code 153 and/or Computer Program Code 193 and/or Computer Program 123 as in FIG. 2] executable by at least one processor [Processor(s) 152 and/or Processors 182 and/or Processor(s) 120 as in FIG. 2].

Figure 6:
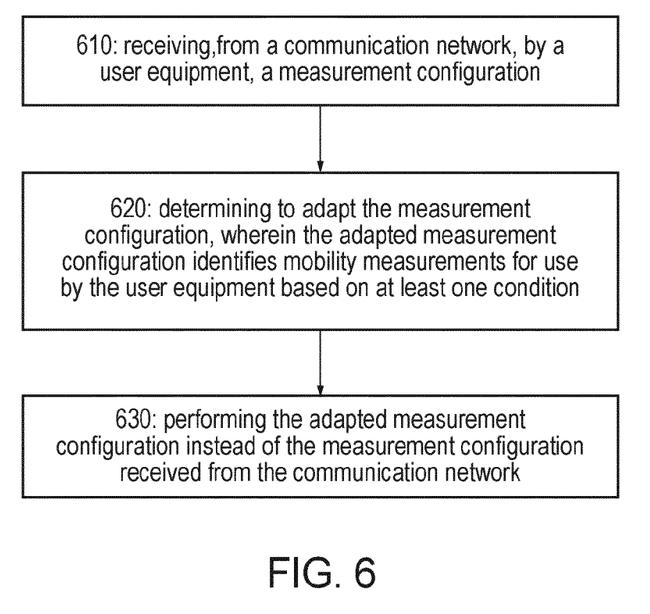
FIG. 6 shows another method in accordance with example embodiments of the invention which may be performed by an apparatus.

FIG. 6 shows a method in accordance with example embodiments of the invention which may be performed by an apparatus. FIG. 6 illustrates operations which may be performed by a device such as, but not limited to, a device such as the gNB 170 and/or gNB 180 and/or UE 110 as in FIG. 2. As shown in step 610 of FIG. 6 there is receiving from a communication network, by a user equipment, a measurement configuration. As shown in step 620 of FIG. 6 there is determining to adapt the measurement configuration, wherein the adapted measurement configuration identifies mobility measurements for use by the user equipment based on at least one condition. Then as shown in step 630 of FIG. 6 there is performing the adapted measurement configuration instead of the measurement configuration received from the communication network.

In accordance with the example embodiments as described in the paragraph above, wherein the at least one condition comprises at least one of a synchronization signal block signal quality condition, and a channel state reference signal associated with the measurement configuration.

In accordance with the example embodiments as described in the paragraphs above, wherein the adapting comprises applying for the measurement configuration an adapted configuration associated with at least one of measurements, a time location, or a periodicity associated with measurements of at least one synchronization signal block.

In accordance with the example embodiments as described in the paragraphs above, wherein the adapted configuration comprises at least one of frequency or cell level information.

In accordance with the example embodiments as described in the paragraphs above, wherein the determining to adapt the measurement configuration uses frequency level information or a lack thereof to adapt the at least one of measurements, a time location, or a periodicity associated with a mask or list configuration for measurement of at least one synchronization signal block with a different center frequency.

In accordance with the example embodiments as described in the paragraphs above, wherein the determining to adapt the measurement configuration comprises based on the adapted configuration for the measurement configuration determining at least one of a scaling factor or an offset to an S-measure threshold to adapt the S-measure threshold.

In accordance with the example embodiments as described in the paragraphs above, wherein for a case where a cell quality based on the channel state reference signal or synchronization signal block associated with the measurement configuration is higher than the adapted S-measure threshold or a configured threshold, there is one of: the user equipment is not required to perform the measurements on non-serving cells, the user equipment performing the measurements on non-serving cells with with an adjusted periodicity or the user equipment is to measure in more relaxed manner the at least one synchronization signal block having the different center frequency.

In accordance with the example embodiments as described in the paragraphs above, wherein the more relaxed manner comprises based on the frequency level information applying an adjusted periodicity to cause a periodicity of at least one of a measurement periodicity or a radio resource management to increase such as to be performed less often on the at least one synchronization signal block having the different center frequency and during at least one of an idle, inactive, or connected mode of the user equipment.

In accordance with the example embodiments as described in the paragraphs above, wherein the determining to adapt the measurement configuration is including intra-frequency, inter-frequency, and carrier aggregation for a specific cell or a set of cells of the communication network.

In accordance with the example embodiments as described in the paragraphs above, wherein the determining comprises identifying a set of the at least one synchronization signal block based on the at least one condition, wherein the set is identified based on a signal quality condition associated with the synchronization signal block signal.

In accordance with the example embodiments as described in the paragraphs above, wherein based on a beam configuration at a location of the user equipment, the adapted measurement configuration causes the user equipment to measure only a subset of the set of synchronization signal blocks.

In accordance with the example embodiments as described in the paragraphs above, wherein the measuring the subset of the set of synchronization signal block based on the adapted measurement configuration is performed by at least one of using a reduced number of synchronization signal block locations, or measuring the subset of the set of synchronization signal blocks with an adjusted periodicity.

In accordance with the example embodiments as described in the paragraphs above, wherein the location of the user equipment is determined using at least one of an L1 reference received signal power measurement and a synchronization signal reference received signal power measurement.

In accordance with the example embodiments as described in the paragraphs above, wherein the periodicity associated with the measurements of at least one synchronization signal block comprises at least one of: an adapted configuration is applied for all synchronization signal block measurement time instances associated with a block measurement time configuration window, an adapted configuration is applied for synchronization signal block measurement time instances indicated by a new periodicity associated with a block measurement time configuration window, or an adapted configuration is applied for synchronization signal block measurement time instances indicated by a new window duration associated with at least one of a block measurement time configuration window or offset.

In accordance with the example embodiments as described in the paragraphs above, wherein the adapted configuration is applied when a location of the user equipment one of remains within specific geographical boundaries or is estimated to be in a specific location of the communication network or under a coverage of certain signals.

In accordance with the example embodiments as described in the paragraphs above, wherein the coverage is based on cell quality (one or more) synchronization signal block or (one or more) or channel state signal quality meets the relative or absolute signal quality threshold condition for duration of time.

In accordance with the example embodiments as described in the paragraphs above, wherein the adapted measurement configuration is applied, when an activation of transmission configuration for physical downlink control channel is indicated for the user equipment, for determining one of: a channel state information reference signal based adaptation, a synchronization signal block based adaptation, or a synchronization signal block based adaptation.

In accordance with the example embodiments as described in the paragraphs above, wherein the at least one condition is one of determined by the user equipment or provided by the communication network.

In accordance with the example embodiments as described in the paragraphs above, wherein the determining to adapt the measurement configuration is based on condition of a user equipment mobility state, where the user equipment mobility state may be determined to be low, medium, high, or stationary, and wherein the user equipment mobility state is determined by the communication network or by the user equipment, autonomously or based on some predefined rules or by communication network and indicated to user equipment.

In accordance with the example embodiments as described in the paragraphs above, wherein the mobility measurements for use by the user equipment based on the at least one condition apply while the user equipment is in any one of a connected state, an inactive state or an idle state.

A non-transitory computer-readable medium (Memory(ies) 155 and/or Memory(ies) 195 and/or Memory(ies) 125 as in FIG. 2) storing program code (Computer Program Code 153 and/or Computer Program Code 193 and/or Computer Program Code 123 as in FIG. 2), the program code executed by at least one processor (Processor(s) 152 and/or Processors 182 and/or Processor(s) 120 as in FIG. 2) to perform the operations as at least described in the paragraphs above.

In accordance with an example embodiment of the invention as described above there is an apparatus comprising: means for receiving (one or more transceivers 130 one or more transceivers 160, and/or one or more transceivers 190; Memory(ies) 155 and/or Memory(ies) 195 and/or Memory(ies) 125; Computer Program Code 133 and/or Computer Program Code 193 and/or Computer Program Code 123; and Processor(s) 152 and/or Processors 182 and/or Processor(s) 120 as in FIG. 2) from a communication network(network 100 as in FIG. 2), by a user equipment (UE 110 as in FIG. 2), a measurement configuration; determining (one or more transceivers 130 one or more transceivers 160, and/or one or more transceivers 190; Memory(ies) 155 and/or Memory(ies) 195 and/or Memory(ies) 125; Computer Program Code 133 and/or Computer Program Code 193 and/or Computer Program Code 123; and Processor(s) 152 and/or Processors 182 and/or Processor(s) 120 as in FIG. 2) to adapt the measurement configuration, wherein the adapted measurement configuration identifies mobility measurements for use by the user equipment based on at least one condition; and performing (one or more transceivers 130 one or more transceivers 160, and/or one or more transceivers 190; Memory(ies) 155 and/or Memory(ies) 195 and/or Memory(ies) 125; Computer Program Code 133 and/or Computer Program Code 193 and/or Computer Program Code 123; and Processor(s) 152 and/or Processors 182 and/or Processor(s) 120 as in FIG. 2) the adapted measurement configuration instead of the measurement configuration received from the communication network.

In the example aspect of the invention according to the paragraphs above, wherein at least the means for receiving, determining, and performing comprises a non-transitory computer readable medium [Memory(ies) 155 and/or Memory(ies) 195 and/or Memory(ies) 125 as in FIG. 2] encoded with a computer program [Computer Program Code 153 and/or Computer Program Code 193 and/or Computer Program 123 as in FIG. 2] executable by at least one processor [Processor(s) 152 and/or Processors 182 and/or Processor(s) 120 as in FIG. 2].

Advantages that can be realized in accordance with the example embodiments of the invention as described herein can include at least:
- Enabling an opportunistic way to allow UE to reduce power consumption in RRIVI measurements;
- Use by the Network of the beam configuration/UE location information in a benefit for reducing UE RRM measurement on specific conditions; and
- Enabling the Network control of UE actions and power saving using the novel signaling in accordance with the example embodiments as described herein.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
receiving from a communication network, by a user equipment, a measurement configuration;
adapting, by the user equipment and based on at least one condition, the measurement configuration, wherein the adapted measurement configuration identifies mobility measurements for use by the user equipment, the at least one condition comprises a synchronization signal block signal quality condition, the adapting comprises applying, for the measurement configuration, an adapted configuration associated with at least one of a time location or a periodicity associated with measurements of at least one synchronization signal block, and the adapting the measurement configuration uses frequency level information to adapt the at least one of a time location or a periodicity associated with at least one measurement of at least one synchronization signal block with a different center frequency; and
performing, by the user equipment, the adapted measurement configuration instead of the measurement configuration received from the communication network.

2. The method of claim 1, wherein the adapted configuration comprises at least one of cell level information or the frequency level information.

3. The method of claim 2, wherein the adapting the measurement configuration comprises, based on the adapted configuration for the measurement configuration, determining at least one of a scaling factor or an offset to an S-measure threshold to adapt the S-measure threshold.

4. The method of claim 3, wherein for a case where a cell quality based on the channel state reference signal or synchronization signal block associated with the measurement configuration is higher than a configured threshold,
the user equipment is to measure in a more relaxed manner the at least one synchronization signal block having the different center frequency.

5. The method of claim 4, wherein the more relaxed manner comprises, based on the frequency level information, applying an adjusted periodicity to cause a periodicity of a measurement periodicity to increase, such as to be performed less often on the at least one synchronization signal block having the different center frequency and during at least one of an idle, inactive, or connected mode of the user equipment.

6. The method of claim 3, wherein the adapting the measurement configuration comprises including intra-frequency, inter-frequency, and carrier aggregation for a specific cell or a set of cells of the communication network.

7. A computer program embodied on a non-transitory computer-readable medium, said computer program comprising program code which, when executed on a computer, causes the computer to execute the method according to claim 1.

8. An apparatus, comprising:
at least one processor; and
at least one memory including computer program code, the at least one memory and computer program code being configured, with the at least one processor, to cause the apparatus to perform:

receiving, from a communication network, a measurement configuration;

adapting, based on at least one condition, the measurement configuration, wherein the adapted measurement configuration identifies mobility measurements for use by the apparatus, the at least one condition comprises a synchronization signal block signal quality condition, the adapting comprises applying, for the measurement configuration, an adapted configuration associated with at least one of a time location or a periodicity associated with measurements of at least one synchronization signal block, and the adapting the measurement configuration uses frequency level information to adapt the at least one of a time location or a periodicity associated with at least one measurement of at least one synchronization signal block with a different center frequency; and performing the adapted measurement configuration instead of the measurement configuration received from the communication network.

9. The apparatus of claim 8, wherein the adapted configuration comprises at least one of cell level information or the frequency level information.

10. The apparatus of claim 9, wherein the adapting the measurement configuration comprises, based on the adapted configuration for the measurement configuration, determining at least one of a scaling factor or an offset to an S-measure threshold to adapt the S-measure threshold.

11. The apparatus of claim 10, wherein for a case where a cell quality based on the channel state reference signal or synchronization signal block associated with the measurement configuration is higher than a configured threshold, the apparatus is to measure in a more relaxed manner the at least one synchronization signal block having the different center frequency.

12. The apparatus of claim 10, wherein the adapting the measurement configuration comprises including intra-frequency, inter-frequency, and carrier aggregation for a specific cell or a set of cells of the communication network.

13. The apparatus of claim 8, wherein the adapting comprises identifying a set of the at least one synchronization signal block based on the at least one condition, wherein the set is identified based on a signal quality condition associated with the synchronization signal block signal.

14. The apparatus of claim 11, wherein the more relaxed manner comprises, based on the frequency level information, applying an adjusted periodicity to cause a periodicity of a measurement periodicity to increase, such as to be performed less often on the at least one synchronization signal block having the different center frequency and during at least one of an idle, inactive, or connected mode of the user equipment.

* * * * *